United States Patent [19]
Salge et al.

[11] 3,737,724
[45] June 5, 1973

[54] CURRENT LIMITING INTERRUPTION OF CURRENTS AT HIGH VOLTAGES

[75] Inventors: Jurgen Salge, Salzgitter-Osterlinde; Hagen Hartel, Braunschweig, both of Germany

[73] Assignee: Dieter Kind, Braunschweig, Germany

[22] Filed: Aug. 5, 1971

[21] Appl. No.: 169,362

[30] Foreign Application Priority Data

Aug. 6, 1970 Germany.....................P 20 39 065.2

[52] U.S. Cl..................317/11 A, 307/133, 307/136, 317/11 E
[51] Int. Cl........................................H02h 7/22
[58] Field of Search ........................317/11 A, 11 E; 307/133, 136

[56] References Cited
UNITED STATES PATENTS

| | | | |
|---|---|---|---|
| 3,522,472 | 8/1970 | Breitholtz | 317/11 E |
| 3,430,062 | 2/1969 | Roth | 317/11 E |
| 3,544,843 | 12/1970 | Sletten et al. | 317/11 A |
| 3,249,810 | 5/1966 | Strom et al. | 317/11 A |
| 3,524,104 | 8/1970 | Willard | 317/11 E |

Primary Examiner—James D. Trammell
Attorney—George H. Spencer and Harvey Kaye

[57] ABSTRACT

An improved circuit for the current limiting interruption of alternating or direct currents in a power main at high voltages of the type wherein an energy absorbing circuit and a capacitor are each connected in parallel with a circuit path including a commutation or interrupter switch so that upon opening of the switch the current flowing therein will be commutated into the parallelly connected circuits wherein the current will be reduced to a residual value which is switched off by a subsequently connected circuit breaker. A further commutating switch is connected in series with the first mentioned commutation switch and an ohmic resistance connected in parallel therewith so that the total series resistance of the ohmic resistance and the arc resistance of the first mentioned commutation switch will be sufficient to cause the commutation of the main current into the energy absorbing and capacitor circuits.

12 Claims, 5 Drawing Figures

CURRENT LIMITING INTERRUPTION OF CURRENTS AT HIGH VOLTAGES

BACKGROUND OF THE INVENTION

The present invention relates to an improved method and apparatus for the current limiting interruption of direct and alternating currents at high voltages. More particularly, the present invention relates to a method and apparatus for this purpose in which the current to be switched off is forced to commutate via switching elements (commutation switches) into auxiliary paths having a high resistance which are connected in parallel with the commutation switch, so that the current is reduced to a residual value which is then switched off by a subsequently connected circuit breaker.

With a current-limiting switch-off in direct current as well as alternating current mains, the switching device must produce a switch voltage after actuation which is greater than the driving voltage in the circuit and it must absorb the energy furnished by the mains (including the energy stored in the inductances of mains) during the switching process. These two requirements can be met up to certain current limits by switches having intensive cooling of the generated arc.

As is known, a switch can also be greatly relieved if auxiliary paths or by-passes are used for the voltage generation and for the energy conversion. This is done, for example, by connecting a capacitor and an energy absorber in parallel with the commutation switch. However, the actual problem involved is the commutation of the current from the switch into the parallel circuits. Although such a commutation can be obtained in principle with a sufficiently large parallel capacitance, the costs involved for the capacitors are high and accordingly often not economically justifiable. A current interrupting arrangement such as illustrated in FIG. 1 was for example proposed by D. Kind, E. Marx, K. Mollenhoff, J. Salge in the paper: Circuit-Breaker for HVDC-Transmissions, CIGRE 1968, Report No. 13–08.

This method for the current limiting interruption of a current at a high voltage is shown schematically in FIG. 1, wherein L indicates the inductance of the mains or conductor, S is a commutation switch, for instance a circuit-breaker with intensive cooling of the arc and $S_R$ is a residual current switch or circuit breaker. An auxiliary commutation circuit including the series connection of an auxiliary switch HS responsive to the arc voltage $V_b$ of switch S, a capacitor C and a leakage inductance $L_s$, and an absorber circuit A containing an energy absorbing element such as an ohmic resistor R, a voltage dependent resistor $R(i)$ or an inductance $L_1$ are each connected in parallel with the commutation switch S. The mains voltage V causes a current $i$ to flow through this total circuit which current initially flows only as the switch current $i_s$ through the commutation switch S and residual current switch $S_R$. When switch S is open an arc voltage $V_b(t)$ which increases with time is produced across switch S. When the value $V_b(t_a) = V_a$ has been reached, the auxiliary switch HS closes and effectively switches the circuit formed by the series connection of capacitor C and inductance $L_s$ in parallel with the switch S. A circuit is now available for the commutation of the current $i$ which is indicated by the equivalent circuit diagram in FIG. 2. $R_S(i, t)$ here represents the arc resistance of the commutating switch S, which increases with time $t$ and which, within certain limits, also increases its resistance even with decreasing current. During the commutation process the current $i$ is approximately constant, i.e., $I_o$. A transfer of current from $R_S$ into the parallel circuits can occur only when $R_S$ can increase its resistance rapidly enough and when its value approaches infinity. This requirement can be made for a given circuit element in that the duration of the commutation process is adapted to the increase in resistance of the arc produced by switch S. This increase in the duration of the commutation process can be achieved, for example, by the selection of a sufficiently large capacitance C. However, with the presently known commutation switches this leads to large banks of capacitors C which as indicated above leads to large expenditures.

SUMMARY OF THE INVENTION

The above drawbacks of the prior art arrangements are avoided and a substantial improvement in the commutation and thus a significant reduction in size of the required capacitors is achieved, according to the present invention, by initially temporarily commutating the current to be switched off into an ohmic resistance connected in series with a switching path (commutating switch) and only thereafter commutating the current from this series path into a parallel circuit having an energy absorber so as to reduce the current to be interrupted to a residual value which is then switched off by a circuit breaker subsequently connected in the current main.

A number of embodiments of circuit arrangements according to the invention are disclosed. According to one embodiment of the invention, a pair of commutating or interrupter switches are connected in series in the main and a highly resistive energy absorbing circuit is connected in parallel with this series connected of commutation switches. A circuit, including an ohmic resistor in series with an auxiliary switch responsive to the arc voltage of a first of the pair of commutating switches, is connected in parallel with the first commutating switch and thus in series with the other of the pair of commutating switches. If required, a further auxiliary commutation circuit, including the series connection of a capacitor, a leakage inductance and an auxiliary switch responsive to the arc voltage of the other of said pair of commutation switches may be connected in parallel with the series connection of the pair of commutating switches.

According to a preferred feature of the invention the ohmic resistor connected in parallel with the first commutating switch is a wire which explodes at a desired current value, i.e., acts as a fuse.

According to a further embodiment of the invention, in order to provide current limiting interruption of currents of different values, a plurality of commutating switches, each having an ohmic resistor, i.e., an exploding wire, dimensioned for the commutation of a different current value, connected in parallel therewith are connected in series with a further commutating switch, and the energy absorbing circuit, and if required the circuit containing the capacitor, are connected across the series connection of all of the commutation switches.

According to still a further embodiment of the invention first and second commutating switches are connected in series in the main, the ohmic resistor is connected in parallel with the first commutation switch and a further circuit, including the series connection of a capacitor having a large capacitance but low rated voltage, a leakage inductance, and a unidirectional auxiliary switch responsive to the arc voltage of the first commutation switch, is also connected in parallel with the first commutation switch. The energy absorbing circuit and the circuit including the capacitor and the auxiliary switch responsive to the arc voltage of the second commutation switch, are each connected in parallel with the series connection of the two commutation switches.

DESCRIPTION OF THE PREFERRED EMBODIMENTS

According to the present invention, the basic current circuits of the prior art are modified by providing an additional circuit arrangement whereby, during the commutation process an ohmic resistance is connected in series with the arc resistance $R_S$ of the commutating switch so that the ohmic resistance together with the arc resistance permits commutation of the current to be switched off from the commutation switch into the circuit containing the capacitor and into the energy absorbing paths. As a result of this additional resistance, the total commutation arrangement need be equipped only with a small capacitor bank or even none at all.

Figure 1:
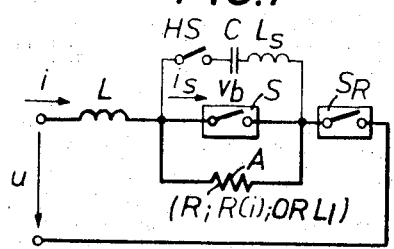
FIG. 1 is a schematic circuit diagram illustrating the principle of a circuit arrangement with commutation device according to the prior art.
Figure 2:
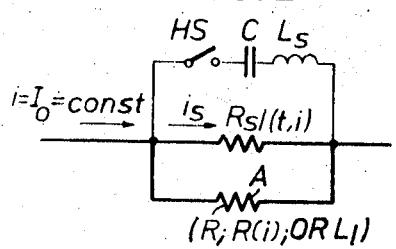
FIG. 2 illustrates the equivalent circuit diagram for the arrangement of FIG. 1 during the commutation process.
Figure 3:
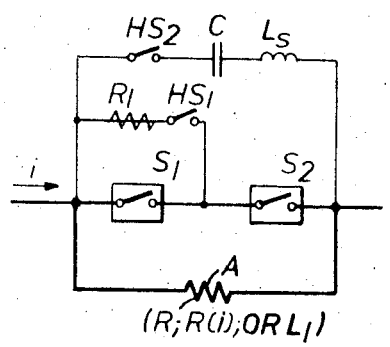
FIG. 3 is a schematic circuit diagram of one embodiment of the invention for the intermediate commutation of the current to be switched off into an exploding wire.

Referring now to FIG. 3 there is shown a first embodiment of an improved commutation circuit according to the invention wherein, as in all succeeding figures, the same reference numerals used in FIG. 1 are utilized to designate similar elements. According to this embodiment, two series connected commutation switches $S_1$ and $S_2$ are connected in the main and the auxiliary circuits, i.e., the energy absorber A and the circuit containing the capacitor C, auxiliary switch HS and the leakage inductance $L_s$, are connected across the series connection of commutation switches $S_1$ and $S_2$. Connected in parallel with commutation switch $S_1$ is a circuit including the series connection of an auxiliary switch $HS_1$, which is responsive to the arc voltage of switch $S_1$, and an ohmic resistance $R_1$. Upon opening of switch $S_1$, and the subsequent closing of auxiliary switch $HS_1$, the current flowing in the main will flow through this resistance $R_1$ which provides a resistance value sufficiently high so that the series resistance of $R_1$ and the arc resistance $R_{S2}$ of switch $S_2$ will cause commutation of the main current into the auxiliary commutation circuits, i.e., the circuit containing the capacitor C and the energy absorber circuit A. Preferably, according to the present invention, the resistance $R_1$ is realized by a wire which is dimensioned so that when a current of the magnitude flowing in the main is directed thereto, it will be heated within a few milliseconds by the current and explode, i.e., act as a fuse, thus causing a very high voltage. Thus, as a result of the high resistance $R_1$ produced by the explosion of the wire in conjunction with the series-connected arc resistance $R_{S2}$ of switch $S_2$, it is possible to obtain dependable commutation of the current from commutating switch $S_2$ into the parallelly connected auxiliary commutation paths containing the capacitor C and accordingly into the energy absorber A. Under certain conditions, it is even possible to do without the auxiliary commutation circuit formed of auxiliary switch HS and capacitor C. Both of the switches $S_1$ and $S_2$ are triggered at the same time by an opening command. The auxiliary switch $HS_1$ closes some milliseconds later. The moment of triggering depends on the value of the arc voltage of the commutation switch $S_1$. The auxiliary switch $HS_2$ closes some milliseconds after the closing of the auxiliary switch $HS_1$. The moment of triggering for this switch depends on the value of the voltage of the series connection of the resistor $R_1$ and the switch $S_2$.

Figure 4:
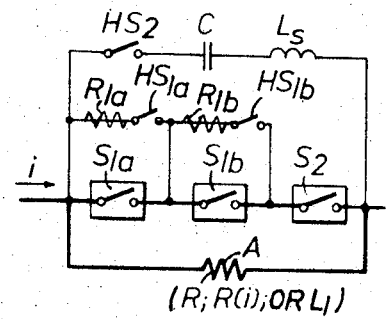
FIG. 4 is a schematic circuit diagram of a further embodiment of the invention for the intermediate commutation of the current to be switched off into two series-connected exploding wires which are designed for different currents.

Since the wire providing the high resistance $R_1$ must be adapted to the current value to be switched off for the commutation of the current from the switching path $S_1$, in order to switch off currents of different values, a circuit according to FIG. 4 must be employed. According to this embodiment of the invention, the commutating switch $S_1$ of FIG. 3 is realized by the series connection of two switches $S_{1a}$ and $S_{1b}$, each of which has a series connection of an auxiliary switch $HS_{1a}$ and $HS_{1b}$ and a respective wire $R_{1a}$ and $R_{1b}$ connected in parallel therewith. Wire $R_{1a}$ is here designed for dependable commutation of the minimum occurring current in the main and $R_{1b}$ is designed for commutation of the maximum occurring current in the main. When switching the minimum current only wire $R_{1a}$ will explode, while when the maximum current is being switched, both wires will explode. Under these circumstances because of the dimensions of wire $R_{1a}$, for small currents the switching path $S_{1a}$ will be triggered back. This, however, will have no influence on the final commutation from switch $S_2$ into the auxiliary circuit. In order to realize a further optimization of the current commutation from switch $S_1$ into the wire, additional series connected switches $S_{1a}$, $S_{1b}$, $S_{1c}$ etc., each having a wire designed for a certain current value connected in parallel therewith, may be provided. Since the wires must be replaced after each switching process, the arrangement corresponds to a type of fuse. The three commutation switches $S_{1a}$, $S_{1b}$, $S_2$ are triggered at the same time by an opening command. The auxiliary switches $HS_{1a}$ and $HS_{1b}$ close some milliseconds later. The moment of triggering depends on the value of the arc voltage of the commutation switches $S_{1a}$ and $S_{1b}$. The auxiliary switch $HS_2$ closes some milliseconds later. The moment of triggering for this switch depends on the value of the voltage of the series connection of the resistors $R_{1a}$, $R_{1b}$ and the commutation switch $S_2$.

Figure 5:
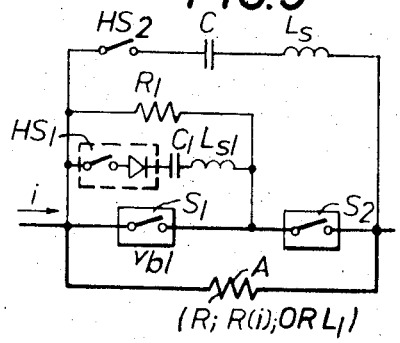
FIG. 5 is a schematic circuit diagram of another embodiment of the invention for the intermediate commutation of the current to be switched off into a current and/or time dependent resistor by means of an auxiliary commutation circuit.

According to this embodiment of FIG. 5, which is similar to FIG. 3, an auxiliary commutation circuit consisting of the series connection of auxiliary switch $HS_1$, leakage inductance $L_{S1}$ and capacitor $C_1$, which has a large capacitance but low rated voltage, and a circuit including an ohmic resistor $R_1$ which may be current dependent, i.e., $R_1(i)$, are each connected in parallel with switch $S_1$. After opening of $S_1$, an arc voltage $V_{b1}(t)$ will be produced across switch S. When the value $V_{b1}(t_a) = V_a$ has been reached, auxiliary switch $HS_1$ will close and connect the capacitor $C_1$ in parallel with switch $S_1$. As a result of the capacitance of capacitor $C_1$ being selected to be sufficiently large, commutation of the main current into the parallel path containing resistor $R_1$ is assured. Resistor $R_1$ is so designed that the voltage across it, after completion of the commutation, is relatively low so that capacitor $C_1$ need only have a low rated voltage and thus only very low output. In this embodiment the auxiliary switch $HS_1$ must be able to prevent current from flowing in the circuit containing capacitor $C_1$ after completion of the commutation of the current into resistor $R_1$. Accordingly, auxiliary switch $HS_1$ may, for example, be a wiper switch, a spark path or gap having a series-connected diode, a triggered spark gap or path or a thyristor. After commutation of the current into resistor $R_1$, the resulting series connection of the resistance of resistor $R_1$ with the arc resistance $R_{S2}$ presents a total resistance which is much more favorable for a commutation of the main current into the parallel circuits including the capacitor C and the energy absorber A than if the commutation into the same auxiliary circuits were to be effected only by the arc resistance $R_{S2}$ of switch $S_2$. The commutation is particularly favored when $R_1$ increases with decreasing current or with increasing time. Both of the switches $S_1$ and $S_2$ are triggered at the same time by opening command. The auxiliary switch $HS_1$ closes some milliseconds later. The triggering moment depends on the value of the arc voltage of the commutation switch $S_1$. The auxiliary switch $HS_2$ closes some milliseconds after the closing of the auxiliary switch $HS_1$.

The disclosed circuit arrangements may also be used in series connections so that the residual current can be reduced to any desired low value. It may also be advantageous to design the individual switches $S_1$, $S_2$, $S_{1a}$, $S_{1b}$ and possibly also further commutation switches as the terminals or partial arcs of a single switch.

It will be understood that the above description of the present invention is susceptible to various modifications, changes and adaptations, and the same are intended to be comprehended within the meaning and range of equivalents of the appended claims.

We claim:

1. In a method for the current limiting interruption of direct and alternating currents flowing in a power main at high voltages in which the current to be switched off is forced to commutate via the opening of a commutating switch into auxiliary parallelly connected circuit paths having a high resistance so that the current is reduced in the auxiliary paths to a residual value which is switched off by a subsequently connected circuit breaker, the improvement comprising temporarily commutating the current flowing through said switch into a circuit path including an ohmic resistor connected in series with said commutating switch ($S_2$) prior to the commutation thereof into said parallelly connected auxiliary circuit paths.

2. In a circuit arrangement for the current limiting interruption of direct and alternating currents flowing in a power main at high voltage having a first commutation switch which carries the current to be switched off connected in a circuit path in series with the power main and a highly resistive energy absorbing circuit, including a resistor or an inductance, connected in parallel with said circuit path, so that the opening of said first switch will cause the commutation of the current to be switched off to said energy absorbing circuit wherein it is reduced to a residual value which is switched off by a circuit breaker subsequently connected in the power main, the improvement comprising: a second commutation switch which also carries the current to be switched off connected in said circuit path in series with said first switch; and an ohmic resistance connected in series with said first commutation switch and in parallel with said second commutation switch whereby upon opening of said second commutation switch, the current to be switched off is temporarily commutated through said resistance thereby connecting same in series with the arc resistance of said first commutation switch.

3. The circuit arrangement defined in claim 2 including an auxiliary switch, which is responsive to the arc voltage across said second commutation switch, connected in series with said ohmic resistance.

4. The circuit arrangement defined in claim 2 including a further circuit connected in parallel with said circuit path, said further circuit including the series connection of an auxiliary switch responsive to the arc voltage of said first commutation switch, a first capacitor, and a leakage inductance.

5. The circuit arrangement defined in claim 3 wherein said ohmic resistance is a wire which explodes upon being heated for a few milliseconds by a predetermined value of current passing therethrough.

6. The circuit arrangement defined in claim 4 including a further commutating switch connected in said circuit path in series with said first and second commutation switches, and a further ohmic resistance connected in parallel with said further commutation switch; each of said ohmic resistances being in the form of a wire which explodes upon being heated for a few milliseconds by a predetermined value of current passing therethrough, with each of said wires being dimensioned to explode for a different current value.

7. The circuit arrangement defined in claim 4 further including an additional circuit means for aiding in the temporary commutation of the current through said ohmic resistance; said additional circuit means consisting of the series connection of an auxiliary switch responsive to the arc voltage of said second commutating switch, a further capacitor having a large capacitance but a low rated voltage compared to the mains voltage, and a leakage inductance, and being connected in parallel with said second commutating switch; said auxiliary switch being of the type which prevents a discharge of said further capacitor through the circuit path formed by said first capacitor, said leakage inductance and said first commutation switch upon completion of the commutation of the current to said ohmic resistance.

8. The circuit arrangement defined in claim 7 wherein said ohmic resistance is a resistor having a constant value of resistance.

9. The circuit arrangement defined in claim 7 wherein said ohmic resistance is a resistor whose resistance value is current dependent.

10. The circuit arrangement defined in claim 7 wherein said auxiliary switch is either a wiper switch, a triggered spark path, a switch or a spark path with a subsequently connected diode, or a thyristor.

11. A circuit arrangement including a plurality of the circuit arrangements as defined in claim 2 connected in series so that the residual current can be reduced to any desired low value.

12. The circuit arrangement defined in claim 2 wherein said commutating switches are terminals or partial arcs of a single switch.

* * * * *